US012344301B2

(12) United States Patent
Zeng

(10) Patent No.: US 12,344,301 B2
(45) Date of Patent: Jul. 1, 2025

(54) PIVOTAL JOINT STRUCTURE AND STROLLER THEREWITH

(71) Applicant: WONDERLAND SWITZERLAND AG, Steinhausen (CH)

(72) Inventor: Haibo Zeng, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 538 days.

(21) Appl. No.: 17/566,103

(22) Filed: Dec. 30, 2021

(65) Prior Publication Data

US 2022/0204067 A1 Jun. 30, 2022

(30) Foreign Application Priority Data

Dec. 31, 2020 (CN) .......................... 202011631787.3

(51) Int. Cl.
*B62B 7/06* (2006.01)
*F16C 11/04* (2006.01)
(52) U.S. Cl.
CPC ................ *B62B 7/06* (2013.01); *F16C 11/04* (2013.01)
(58) Field of Classification Search
CPC ........... B62B 7/06; B62B 7/062; B62B 7/064; B62B 7/066; B62B 7/08; B62B 2205/20; B62B 2205/24; Y10T 403/32409; Y10T 403/32606; Y10T 403/32861; Y10T 403/32951; Y10T 403/32975; Y10T 403/32983; F16B 7/0413; F16C 11/04
USPC ...................................................... 403/68, 81
See application file for complete search history.

(56) References Cited

U.S. PATENT DOCUMENTS

| 5,188,389 A * | 2/1993 | Baechler | ................... B62B 7/10 |
| | | | 301/121 |
| 5,476,275 A * | 12/1995 | Baechler | ................. B62B 9/087 |
| | | | 280/47.38 |
| 7,296,819 B2 * | 11/2007 | Cunningham | .......... B62B 9/104 |
| | | | 280/47.39 |
| 8,696,016 B2 * | 4/2014 | Homan | ................... B62B 9/104 |
| | | | 280/47.38 |

(Continued)

FOREIGN PATENT DOCUMENTS

| CN | 2848603 Y | 12/2006 |
| CN | 202753996 U | 2/2013 |

(Continued)

*Primary Examiner* — Amber R Anderson
*Assistant Examiner* — Kevin J Baynes
(74) *Attorney, Agent, or Firm* — HAUPTMAN HAM, LLP

(57) ABSTRACT

A pivotal joint structure is connected to a front leg and a bottom pipe of a stroller. The pivotal joint structure includes a connecting component disposed in the bottom pipe. A first end of the connecting component is fixedly connected to the front leg. The pivotal joint structure further includes an inner fixing component and an outer fixing component, which are disposed in the bottom pipe and connected to the bottom pipe. The connecting component is disposed between the inner fixing component and the outer fixing component, and the inner fixing component and the outer fixing component are rotatable around the connecting component. The front leg can be further folded relative to the bottom pipe by the pivotal joint structure. Therefore, the occupied space of the folded stroller can be further reduced, so as to facilitate carrying and storage when not in use.

15 Claims, 7 Drawing Sheets

(56) References Cited

U.S. PATENT DOCUMENTS

| | | | | |
|---|---|---|---|---|
| 9,108,656 B1* | 8/2015 | Nolan | ........................ | B62B 3/02 |
| 9,227,649 B2* | 1/2016 | Wu | .......................... | B62B 7/083 |
| 9,393,982 B2* | 7/2016 | Tomasi | ..................... | B62B 7/06 |
| 9,638,243 B2* | 5/2017 | Li | ............................ | F16C 11/10 |
| 9,707,987 B2* | 7/2017 | Hanson | ................... | B62B 7/068 |
| 9,718,488 B2* | 8/2017 | Singh | ....................... | B62B 7/068 |
| 2015/0059088 A1* | 3/2015 | Szymanski | ............. | F16C 11/04 |
| | | | | 5/99.1 |

FOREIGN PATENT DOCUMENTS

| | | | |
|---|---|---|---|
| CN | 109606021 A | 4/2019 | |
| WO | 2020232652 A1 | 11/2020 | |

\* cited by examiner

PIVOTAL JOINT STRUCTURE AND STROLLER THEREWITH

FIELD

The present application relates to a pivotal joint structure and a stroller therewith, and more particularly, to a pivotal joint structure and a stroller therewith capable of further folding the front leg, so as to reduce occupied space of the folded stroller.

BACKGROUND

A stroller can reduce burden caused by holding a baby for a long time and provide comfort for the baby. A main structure of the stroller usually includes a handle, a front leg and a rear leg pivoted to the handle, and front wheels and rear wheels respectively installed on the front leg and the rear leg. In addition, in order to enhance the overall strength of the stroller, a bottom frame connecting the front leg and the rear leg is usually provided. In order to facilitate carrying and storage when not in use, the stroller is usually foldable, for example, the front leg, the rear leg and lateral armrests of the stroller can be folded. For example, a lower end of the handle can be pivoted to a front end of the rear leg through a first pivot, and a rear end of the front leg can be pivoted to the rear leg through a second pivot. The second pivot is located below the first pivot, an upper end of a first link is pivoted to the handle, a front end of a second link is pivoted to the front leg, a lower end of the first link is pivoted to a rear end of the second link and can be movably connected with the rear leg upwardly and downwardly, and a seat is connected with a front end of the rear leg.

DETAILED DESCRIPTION

In order to illustrate technical specifications and structural features as well as achieved purposes and effects of the present application, relevant embodiments and figures are described as follows.

In the following detailed description of the preferred embodiments, reference is made to the accompanying drawings which form a part hereof, and in which is shown by way of illustration specific embodiments in which the application may be practiced. In this regard, directional terminology, such as "top," "bottom," "front," "back," etc., is used with reference to the orientation of the Figure(s) being described. The components of the present application can be positioned in a number of different orientations. As such, the directional terminology is used for purposes of illustration and is in no way limiting. Accordingly, the drawings and descriptions will be regarded as illustrative in nature and not as restrictive.

Figure 1:
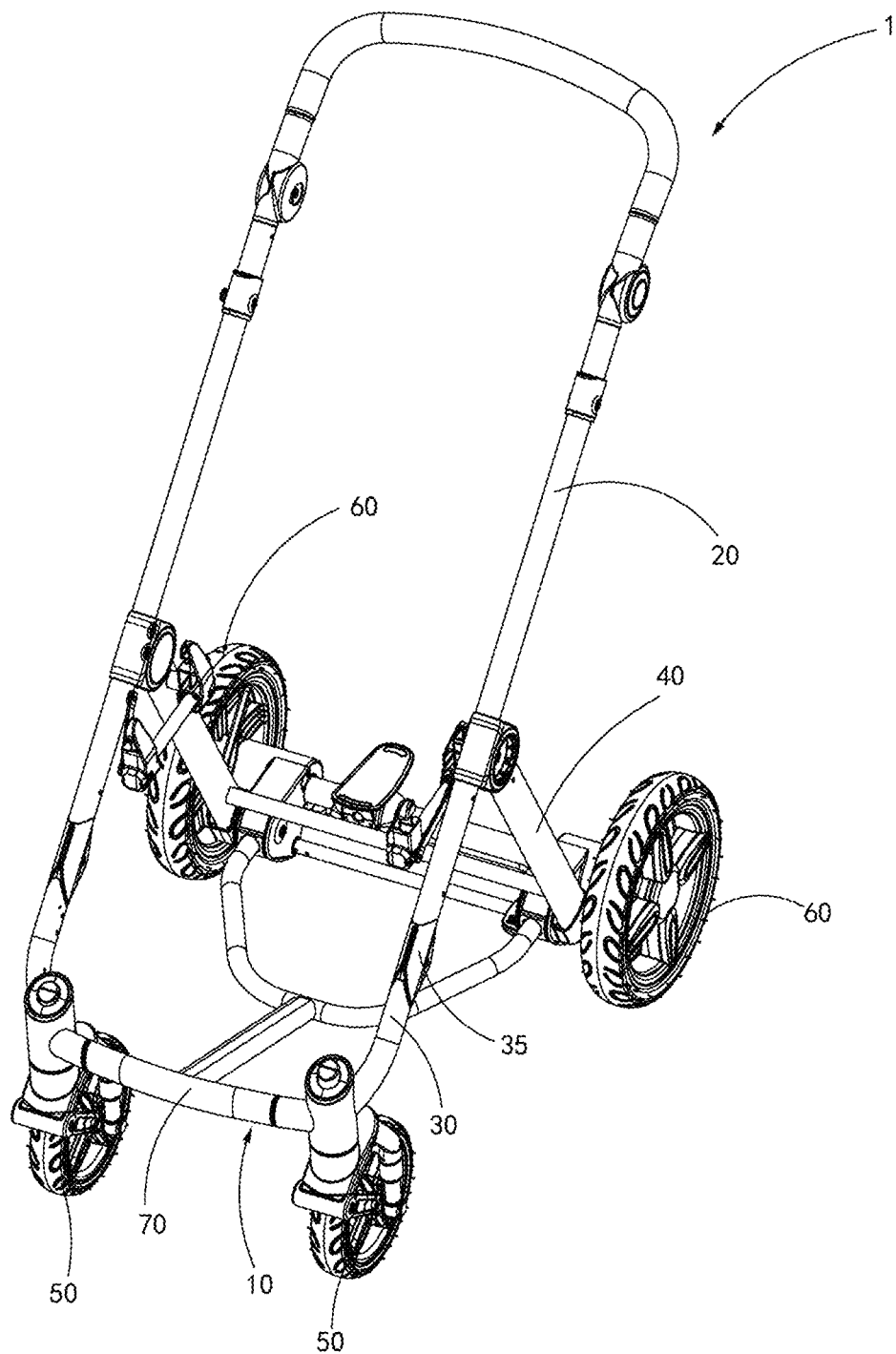
FIG. 1 is a structural diagram of a stroller according to an embodiment of the present application.

Please refer to FIG. 1. FIG. 1 is a structural diagram of a stroller 1 according to an embodiment of the present application. The stroller 1 includes a handle 20, a front leg 30 connected to the handle 20, a rear leg 40 connected to the handle 20, two front wheels 50 connected to the front leg 30, two rear wheels 60 connected to the rear leg 40, and a bottom pipe 70 connected to the front leg 30 and the rear leg 40. The front leg 30 and the rear leg 40 can be pivotally connected to the handle 20, so as to form main structure of the stroller 1. Besides, in order to enhance stability, the stroller 1 includes the bottom pipe 70 connected to the front leg 30 and the rear leg 40, and the bottom pipe 70 can be pivotally connected to the rear leg 40.

Figure 2:
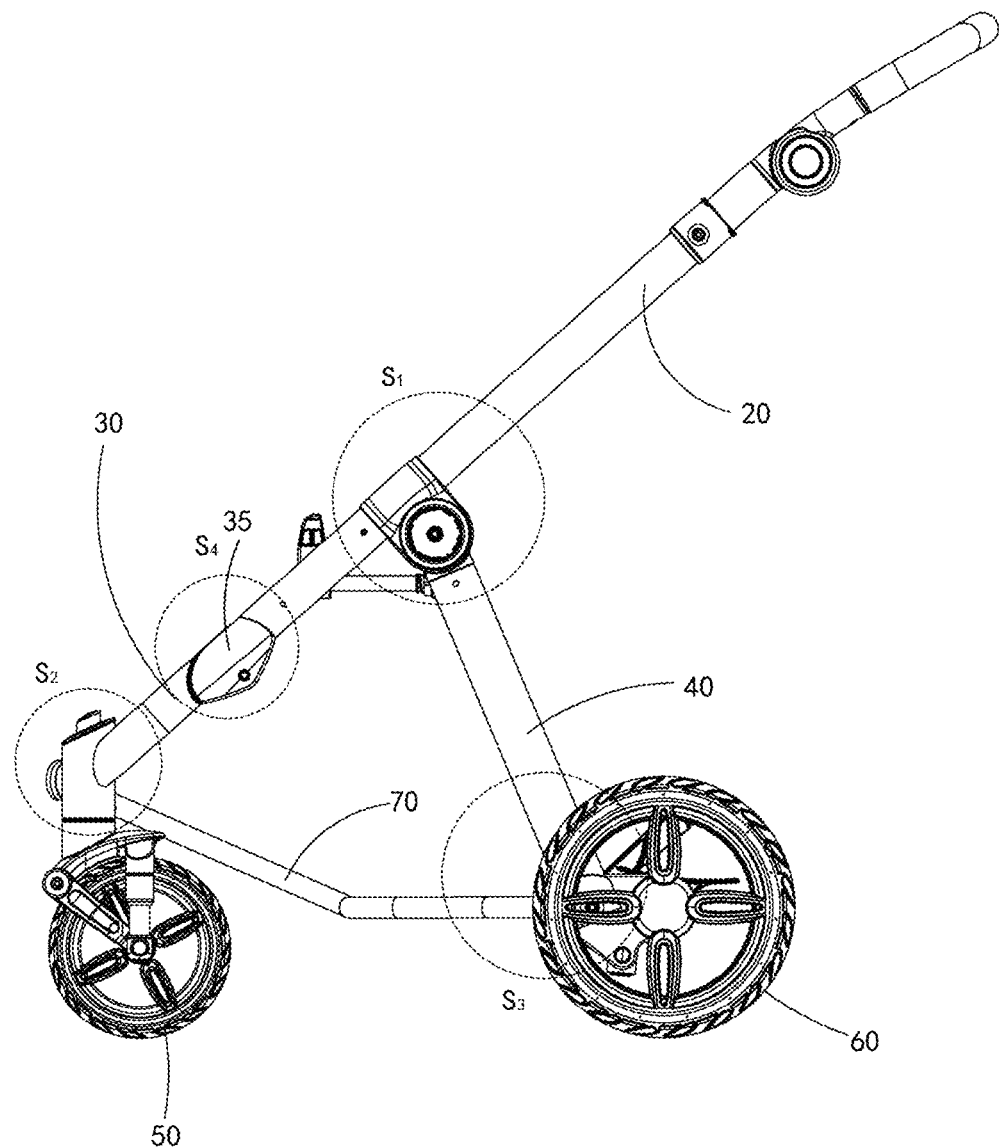
FIG. 2 is a lateral view of the stroller according to the embodiment of the present application.

Please refer to FIG. 1 and FIG. 2. FIG. 2 is a lateral view of the stroller 1 according to the embodiment of the present application. The stroller 1 can be folded at multiple positions. As shown in FIG. 2, the handle 20 and the front leg 30 are pivotally connected at S1, and the rear leg 40 and the bottom pipe 70 are pivotally connected at S3. The front leg 30 includes at least one pivotal joint 35, so that the front leg 30 also can be pivoted to be folded at S4. The stroller 1 of the present application can be pivotally folded at S1, S3 and S4, and the front leg 30 can be further folded relative to the bottom pipe 70 at S2 shown in FIG. 2 by means of at least one pivotal joint structure 10.

Figure 3:
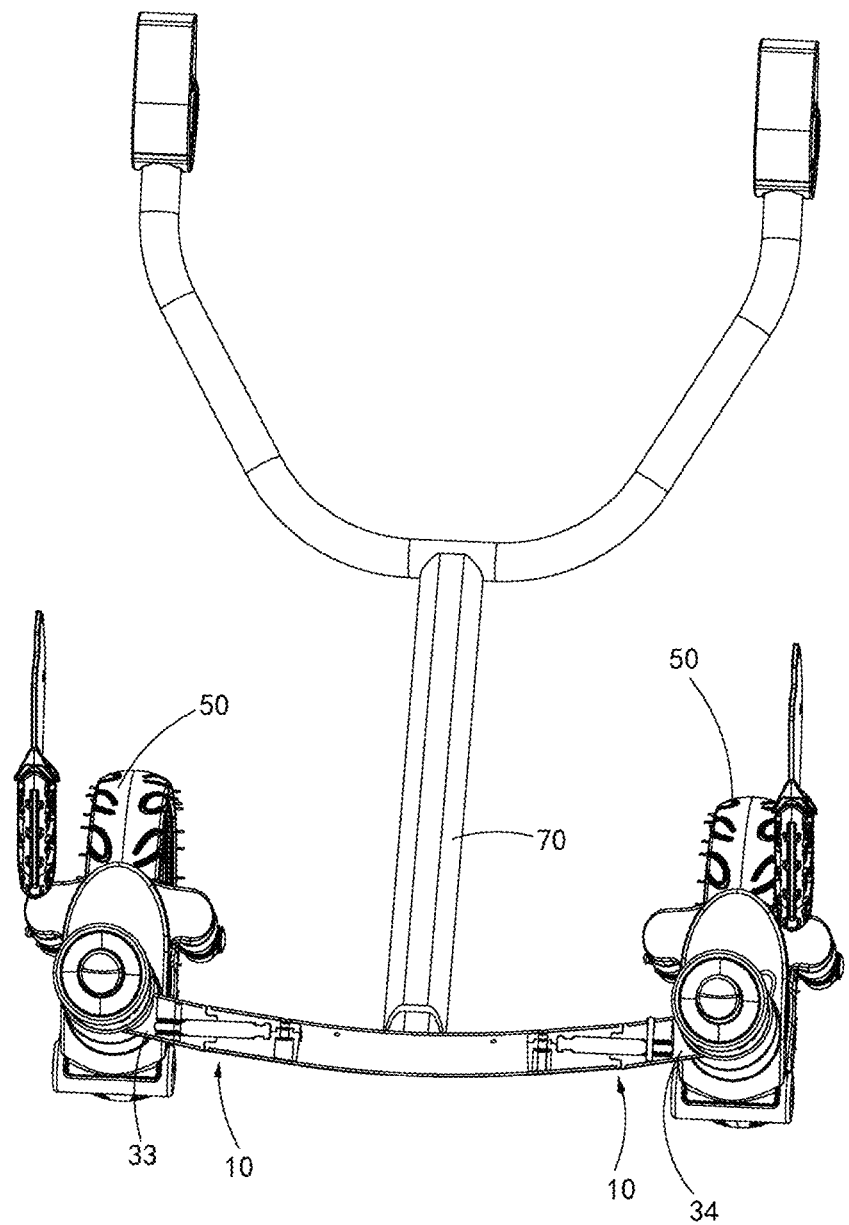
FIG. 3 is a top view of the stroller according to the embodiment of the present application.

Please refer to FIG. 1 to FIG. 3. FIG. 3 is a top view of the stroller 1 according to the embodiment of the present application. The stroller 1 further includes two pivotal joint structures 10 fixedly connected to a first connecting end 33 and a second connecting end 34 of the front leg 30, respectively. In this way, the stroller 1 can be pivotally folded at S1, S3 and S4, and the front leg 30 can be further folded relative to the bottom pipe 70 by the two pivotal joint structures 10, so as to reduce occupied space of the folded stroller 1 and make the folded stroller 1 more compact. Besides, the two pivotal joint structures 10 can make the folding action more stable. Alternatively, the stroller can include only one pivotal joint structure, and the single pivotal joint structure can be installed on a central portion of the bottom pipe.

Figure 4:
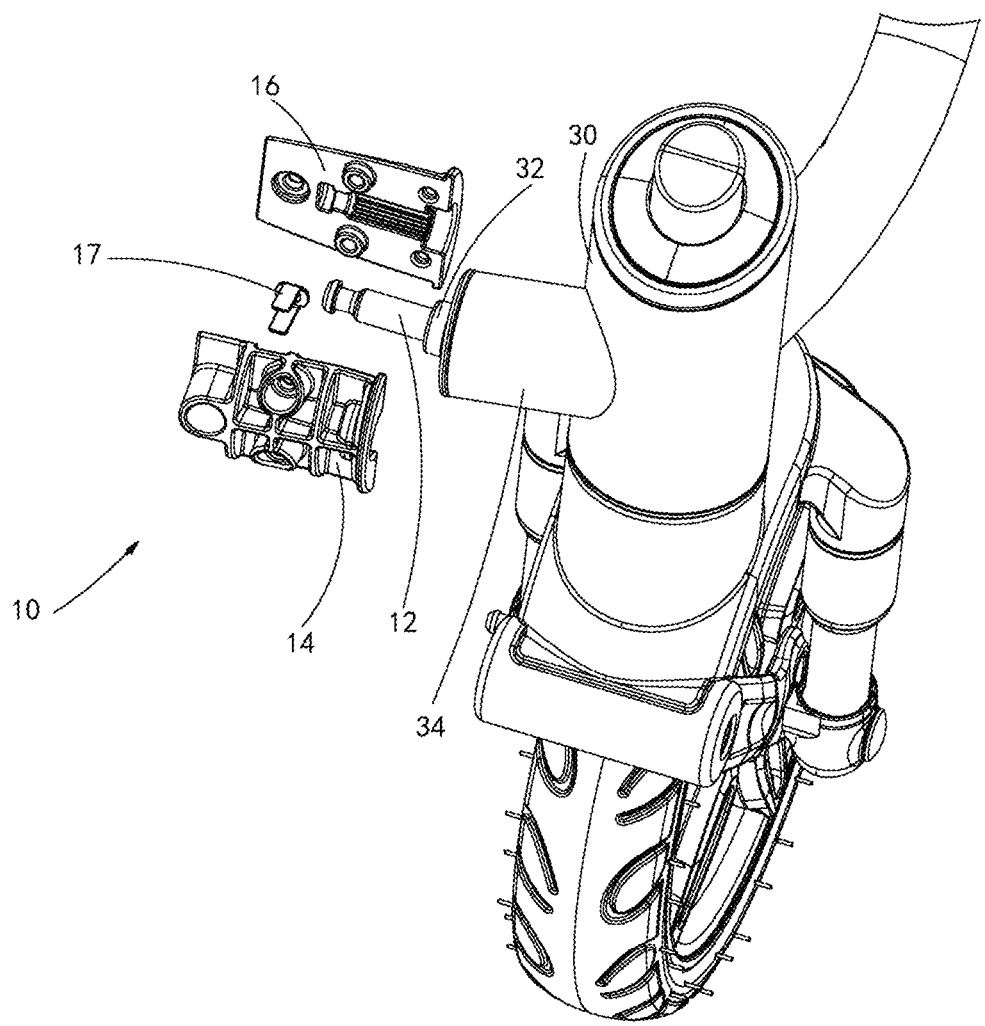
FIG. 4 is a diagram of a pivotal joint structure according to the embodiment of the present application.
Figure 5:
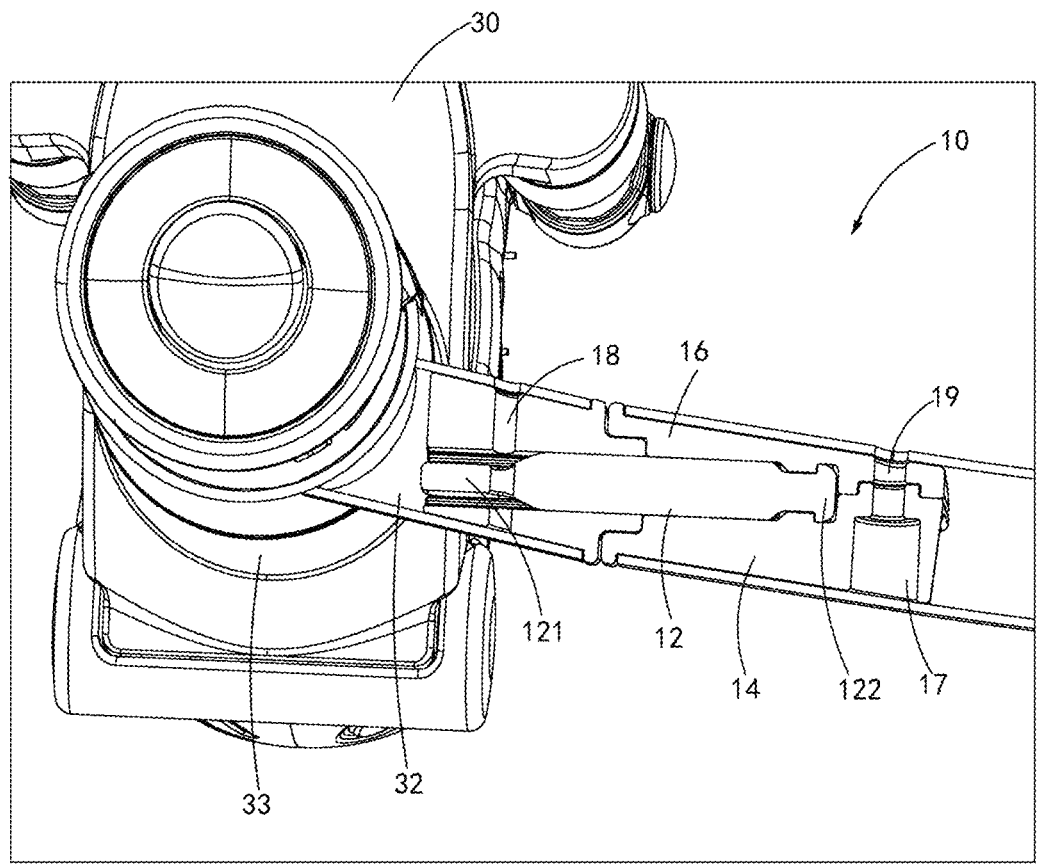
FIG. 5 is an internal structural diagram of the pivotal joint structure according to the embodiment of the present application.

Please refer to FIG. 4 and FIG. 5. FIG. 4 is a diagram of the pivotal joint structure 10 according to the embodiment of the present application. FIG. 5 is an internal structural diagram of the pivotal joint structure 10 according to the embodiment of the present application. Each pivotal joint structure 10 is connected to the front leg 30 and the bottom pipe 70. The pivotal joint structure 10 connected to the second connecting end 34 of the front leg 30 is illustrated in FIG. 4. The pivotal joint structure 10 connected to the first connecting end 33 of the front leg 30 is illustrated in FIG. 5. Each pivotal joint structure 10 includes a connecting component 12, an inner fixing component 14 and an outer fixing component 16. The connecting component 12, the inner fixing component 14 and the outer fixing component 16 are disposed in the bottom pipe 70. A first end 121 of the connecting component 12 is fixedly connected to the front leg 30, and a second end 122 of the connecting component 12 is disposed between the inner fixing component 14 and the outer fixing component 16. Specifically, the front leg 30 includes two fixing bases 32 disposed on the first connecting end 33 and the second connecting end 34 of the front leg 30 and fixedly connected to the two connecting components 12 of the two pivotal joint structures 10, respectively. That is, the first end 121 of each connecting component 12 is fixedly connected to the corresponding fixing base 32. The inner fixing component 14 and the outer fixing component 16 are connected to the bottom pipe 70, the connecting component 12 is disposed between the inner fixing component 14 and the outer fixing component 16, and the inner fixing component 14 and the outer fixing component 16 are rotatable around the connecting component 12.

Preferably, each pivotal joint structure 10 further includes a pin 18, and the connecting component 12 is fixedly connected to the fixing base 32 by the pin 18. Besides, each pivotal joint structure 10 further includes a reinforcing component 17 disposed on the outer fixing component 16. The reinforcing component 17 also can be disposed on the inner fixing component 14. The reinforcing member 17 is used to enhance the connection strength of the inner fixing component 14 and the outer fixing component 16. Furthermore, each pivotal joint structure 10 further includes a rivet 19, and the inner fixing component 14 and the outer fixing component 16 are connected to the bottom pipe 70 by the rivet 19.

The inner fixing component 14, the outer fixing component 16 and the bottom pipe 70, which is connected with the inner fixing component 14 and the outer fixing component 16, can rotate relative to the connecting component 12 within a certain range together, and the connecting component 12 is fixedly connected to the front leg 30, so as to drive the front leg 30 to pivot relative to the bottom pipe 70. In contrast with the conventional stroller, the front leg 30 of the stroller 1 of the present application can be folded by the pivotal joint structure 10, so as to reduce occupied space of the folded stroller 1.

Figure 6:
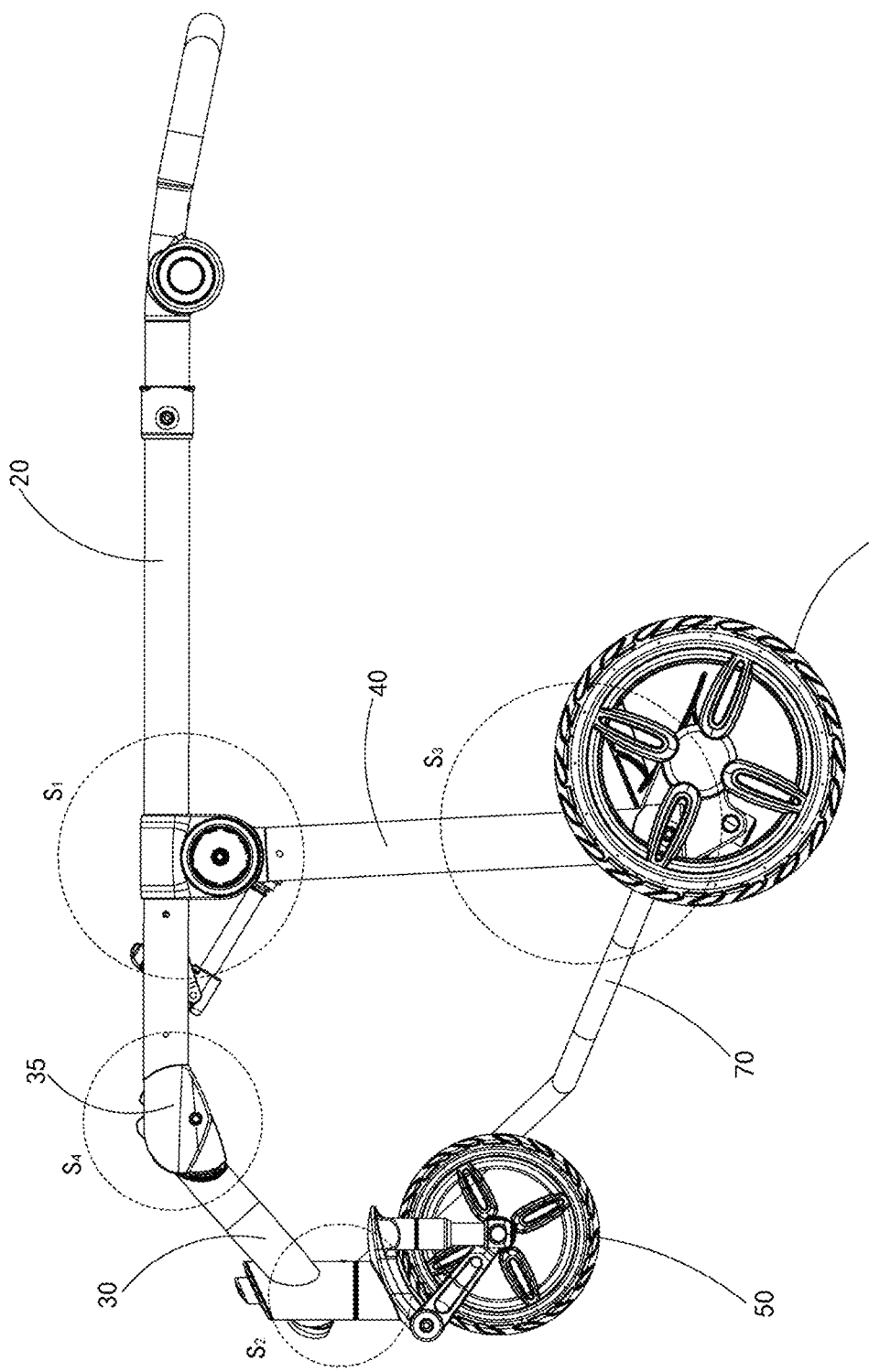
FIG. 6 and FIG. 7 are diagrams of the stroller in different folding statuses according to the embodiment of the present application.
Figure 7:
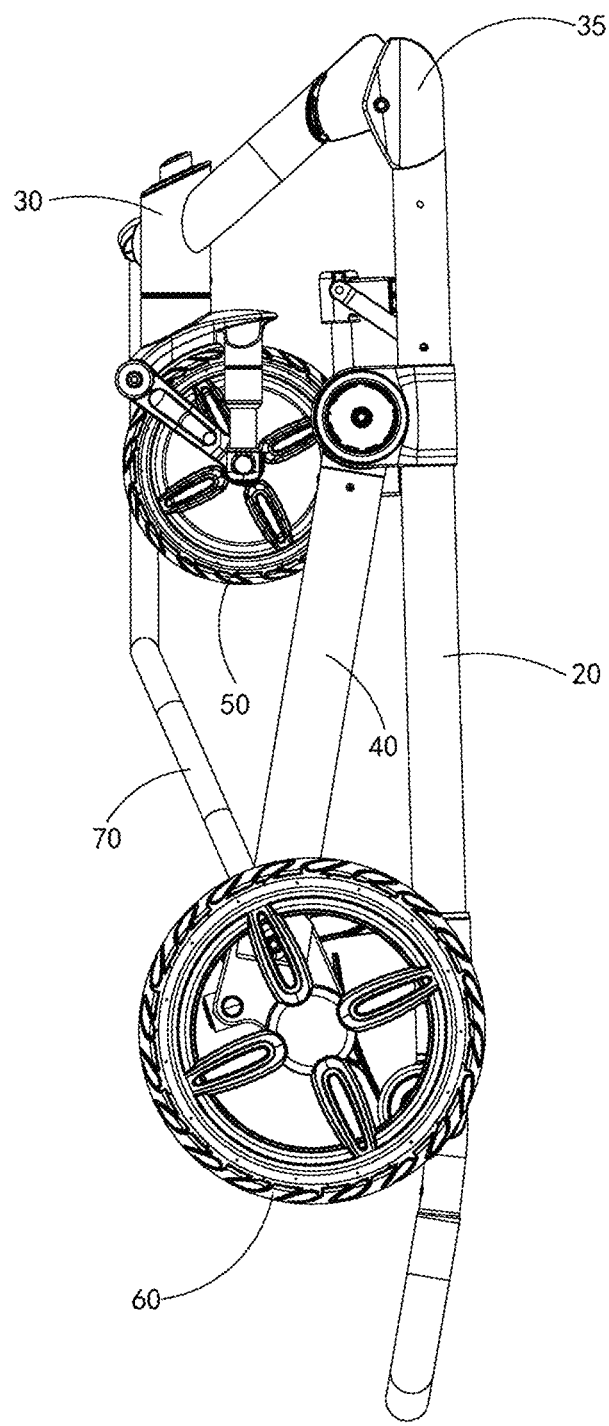

Please refer to FIG. 6 and FIG. 7. FIG. 6 and FIG. 7 are diagrams of the stroller 1 in different folding statuses according to the embodiment of the present application. As mentioned above, the stroller 1 can be pivotally folded at S1, S2, S3, and S4. In particular, the front leg 30 and the front wheels 50 connected to the front leg 30 can be further folded relative to the bottom pipe 70 by the pivotal joint structure 10. However, the folding structure of the conventional stroller is usually complicated, and only some parts can be partially folded. Besides, the conventional folding operation is difficult and inconvenient to operate, and the occupied space of the folded stroller is still too large, which is inconvenient in carrying and storage when not in use. Therefore, as shown in FIG. 7, in contrast with the conventional stroller, the occupied space of the folded stroller 1 of the present application can be further reduced, so as to facilitate carrying and storage when not in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pivotal joint structure connected to a front leg and a bottom pipe of a stroller, the pivotal joint structure comprising:
   a connecting component disposed in the bottom pipe, and a first end of the connecting component being fixedly connected to the front leg;
   an inner fixing component disposed in the bottom pipe and connected to the bottom pipe; and
   an outer fixing component disposed in the bottom pipe and connected to the bottom pipe, the connecting component being disposed between the inner fixing component and the outer fixing component, and the inner fixing component and the outer fixing component being rotatable around the connecting component,
   wherein each of the inner fixing component and the outer fixing component is elongated in a first direction along an axial direction of the bottom pipe, and the connecting component is elongated in a second direction intersecting the first direction.

2. The pivotal joint structure of claim 1, wherein the front leg comprises a fixing base, and the first end of the connecting component is fixedly connected to the fixing base.

3. The pivotal joint structure of claim 2, further comprising a pin, and the connecting component being fixedly connected to the fixing base by the pin.

4. The pivotal joint structure of claim 1, further comprising a reinforcing component disposed on the outer fixing component or the inner fixing component.

5. The pivotal joint structure of claim 1, further comprising a rivet, and the inner fixing component and the outer fixing component being connected to the bottom pipe by the rivet.

6. A stroller comprising:
   a handle;
   a front leg connected to the handle;
   a rear leg connected to the handle;
   at least one front wheel connected to the front leg;
   at least one rear wheel connected to the rear leg;
   a bottom pipe connected to the front leg and the rear leg; and
   at least one pivotal joint structure connected to the front leg and the bottom pipe, the front leg and the bottom pipe being connected to each other at the at least one front wheel, the at least one pivotal joint structure comprising:
      a connecting component disposed in the bottom pipe, and a first end of the connecting component being fixedly connected to the front leg;
      an inner fixing component disposed in the bottom pipe and connected to the bottom pipe; and
      an outer fixing component disposed in the bottom pipe and connected to the bottom pipe, the connecting component being disposed between the inner fixing component and the outer fixing component, and the inner fixing component and the outer fixing component being rotatable around the connecting component,
   wherein each of the inner fixing component and the outer fixing component is elongated in a first direction, and the connecting component is elongated in a second direction intersecting the first direction.

7. The stroller of claim 6, wherein
the front leg defines a first front leg of the stroller,
the stroller further comprises a second front leg, and
the at least one pivotal joint structure comprises two pivotal joint structures fixedly connected to a first connecting end of the first front leg and a second connecting end of the second front leg, respectively.

8. The stroller of claim 7, wherein
each of the two pivotal joint structures includes a corresponding connecting component,
the first front leg comprises a first fixing base disposed on the first connecting end and the second front leg comprises a second fixing base disposed on the second connecting end, and
the first and second fixing bases are fixedly connected to the connecting components of the two pivotal joint structures, respectively.

9. The stroller of claim 6, wherein the handle is pivotally connected to the rear leg, the handle is pivotally connected to the front leg, and the rear leg is pivotally connected to the bottom pipe.

10. The stroller of claim 9, wherein the front leg comprises a pivotal joint.

11. The stroller of claim 6, wherein the front leg comprises a fixing base, and the first end of the connecting component is fixedly connected to the fixing base.

12. The stroller of claim 11, wherein the at least one pivotal joint structure further comprises a pin, and the connecting component is fixedly connected to the fixing base by the pin.

13. The stroller of claim 6, wherein the at least one pivotal joint structure further comprises a reinforcing component disposed on the outer fixing component or the inner fixing component.

14. The stroller of claim 6, wherein the at least one pivotal joint structure further comprises a rivet, and the inner fixing component and the outer fixing component are connected to the bottom pipe by the rivet.

15. The stroller of claim 6, wherein each of the inner fixing component and the outer fixing component is elongated in the first direction along an axial direction of the bottom pipe.

* * * * *